United States Patent [19]

Luh

[11] 3,816,347

[45] June 11, 1974

[54] SEMICONDUCTIVE ELASTOMERIC COMPOSITION OF CHLORINATED OR CHLOROSULFONATED POLYETHYLENE, ETHYLENE POLYMER AND CONDUCTIVE CARBON BLACK

[75] Inventor: Donald Richard Luh, Newark, Del.

[73] Assignee: E. I. du Pont de Nemours and Company, Wilmington, Del.

[22] Filed: Nov. 2, 1972

[21] Appl. No.: 303,207

[52] U.S. Cl............... 252/511, 106/307, 260/41 R, 260/884, 260/897 C
[51] Int. Cl......................... H01b 1/06, C08f 29/14
[58] Field of Search........... 252/511; 260/41 R, 884, 260/897 C; 106/307

[56] References Cited
UNITED STATES PATENTS

| | | | |
|---|---|---|---|
| 2,854,425 | 9/1958 | Boger et al. | 260/897 C |
| 3,567,607 | 3/1971 | Saunders et al. | 252/511 X |
| 3,641,216 | 2/1972 | Schnebelen | 260/897 C |
| 3,747,029 | 7/1973 | Prinzhorn | 252/511 X |

FOREIGN PATENTS OR APPLICATIONS 726,232   1/1966   Canada

*Primary Examiner*—Leland A. Sebastian
*Assistant Examiner*—R. E. Schafer

[57] ABSTRACT

An elastomeric composition having beneficial utility for the formation of a vulcanized semiconductive layer on an electric cable (e.g., a cable having an ethylene polymer insulation layer), and comprising (A) an elastomer selected from chlorosulfonated polyethylene and chlorinated polyethylene, (B) an ethylene polymer selected from polyethylene and copolymers of ethylene with propylene and/or a diene, (C) conductive carbon black and (D) a peroxide curing agent. It is preferred also to add a plasticizer, an auxiliary curing agent which will enhance the state of cure, and an acid acceptor type of heat stabilizer for the elastomer.

10 Claims, No Drawings

SEMICONDUCTIVE ELASTOMERIC COMPOSITION OF CHLORINATED OR CHLOROSULFONATED POLYETHYLENE, ETHYLENE POLYMER AND CONDUCTIVE CARBON BLACK

BACKGROUND OF THE INVENTION

This invention relates to elastomeric compositions which can be used to form vulcanized semiconductive layers on electric cables.

There is a need in the electric cable industry for an improved elastomeric composition from which one can form a vulcanized semiconductive layer on an electric cable. What is especially needed is such a composition which can be used to form a durable and heat-resistant vulcanized semiconductive elastomeric outer layer or jacket on an electric cable in which the conductive metallic core has been coated with a polymeric insulation layer. Furthermore, it is desired that the vulcanized jacket not only will adhere to the insulation layer during normal handling and use of the cable, but also will be strippable from the insulation layer when one wishes to strip a portion of the jacket during conventional installation operations.

SUMMARY OF THE INVENTION

The present invention provides an elastomeric composition, useful for the manufacture of a vulcanized semiconductive layer on an electric cable, which comprises
A. 100 parts by weight of an elastomer selected from the group: chlorosulfonated polyethylene and chlorinated polyethylene,
B. about 15–100 parts by weight of a polymer selected from the group: polyethylene having a melt index of about 0.5–100 and copolymers of at least 40 percent by weight of ethylene and at least one monomer selected from propylene and dienes,
C. about 40–150 parts by weight of electrically conductive carbon black, and
D. about 1–10 parts by weight of a peroxide curing agent.

The invention also provides a cured elastomeric composition obtained by heating the composition described in the previous paragraph.

DESCRIPTION OF PREFERRED EMBODIMENTS

Component (A) of the present composition can be any known chlorosulfonated polyethylene elastomer or chlorinated polyethylene elastomer which is capable of being cured with the aid of a curing agent. One skilled in the art will have no difficulty in selecting a suitable grade of component (A) elastomer for a particular application after considering the properties desired in the cured product and the kind and amount of other ingredients to be used in the composition. A chlorosulfonated polyethylene elastomer is often preferred as component (A).

Component (B) consists of about 15–100 parts by weight (per 100 parts of component (A)), preferably about 20–50 parts, of a polymer selected from polyethylene having a melt index of about 0.5–100 and copolymers of at least 40 percent by weight of ethylene and about 1–60 percent by weight of propylene or a diene or a blend thereof. Such ethylene copolymers are well known in the art; for example, they can be prepared according to the teaching of U.S. Pat. Nos. 3,000,866, 3,093,620, 3,093,621, 3,151,173 and 3,365,418, and Canadian Pat. Nos. 762,535, 826,733, 865,061 and 897,895. An especially useful component (B) polymer is an elastomeric copolymer of about 50–75 percent by weight of ethylene, about 20–45% by weight of propylene and about 3–16% by weight of 1,4-hexadiene or 5-ethylidene-2-norbornene. Component (B) is selected from normally solid polymers which are capable of being cured with a peroxide curing agent.

Component (C) consists of about 40–150 parts by weight (per 100 parts of component (A)), preferably about 45–75 parts, of an electrically conductive carbon black. Conductive furnace black is used as component (C) in many of the best embodiments of the invention. Results which are useful for some applications can also be obtained with other types of conductive carbon black, for example acetylene black.

Component (D) consists of about 1–10 parts by weight (per 100 parts of component (A)), preferably about 2–5 parts, of a peroxide curing agent. Component (D) can be considered as a vulcanization agent or crosslinking agent for components (A) and (B) since it causes crosslinking of the polymer components when used either alone or in the presence of the auxiliary curing agent mentioned below. It includes peroxy compounds from which peroxides are formed during the curing operation. Component (D) can be selected from peroxy compounds known to be useful in the curing of elastomers. Organic peroxides are preferred; especially preferred are those having no carboxylic acid groups, such as dicumyl peroxide and ditertiary-butyl peroxide. A peroxide compound is used which will not undergo any undue amount of decomposition during the mixing of ingredients and other operations which precede curing of the composition, and which will decompose under the curing conditions to be used at a rate sufficient to provide suitable speed of curing of the curable components present.

It is preferred that the composition also contain about 2–70 parts by weight (per 100 parts of component (A)), preferably about 4–55 parts, of an acid acceptor type of heat stabilizer for component (A). Useful acid acceptors are compounds capable of enhancing the resistance of component (A) to decomposition, especially at elevated temperatures, during preparation and use of the cured product. Preferred acid acceptors include litharge, dibasic lead phthalate and epoxidized oils. Also useful are other known acid acceptor heat stabilizers for component (A) type elastomers, for example other basic metal compounds such as basic oxides.

It is usually preferred that the composition also contain about 0.5–15 parts (per 100 parts of component (A)), preferably about 2.5–10 parts, of an auxiliary curing agent which is a non-peroxide compound capable of enhancing the state of cure obtained with component (D). This component can also be called a curing aid or activator. Preferred auxiliary curing agents include trimethylolpropane trimethacrylate, triallyl cyanurate, triallyl phosphate and metaphenylene-bis-maleimide. Also useful are other compounds known to serve as auxiliary curing agents in the peroxide curing of the polymers. The tensile strength and modulus values of the cured product are increased by the use of an auxiliary curing agent.

It is also usually preferred that the composition contain about 10–50 parts (per 100 parts of component (A)) of a plasticizer for component (A). Petroleum derived hydrocarbon oil plasticizers and chlorinated paraffin plasticizers are preferred.

Other additives known to be useful in compositions containing component (A) or component (B) can also be present in the composition, for example antioxidants, light stabilizers, solvents, pigments and fillers.

In a typical application, a layer of the composition is applied to a suitable substrate and the resulting assembly is heated at an elevated temperature until the composition is cured. A temperature is selected (e.g., within the range of about 130°–205°C) which will not cause any harmful reaction or decomposition of the components of the assembly. Known coating and laminating methods can be used to apply the layer to the substrate, for example extruding, calendaring and spreading. If desired, the composition can be in the form of a solution or dispersion in an organic liquid or water during application to the substrate. In some applications, the layer of composition is subjected to pressure during the curing operation. An electric cable can be coated with a layer of a composition by continuous extrusion procedures known in the art, and the resulting coated cable can be passed through a heat zone until the layer of composition is cured. The heat zone can be a long duct containing hot air, molten metal or salt, or steam under a selected pressure. An electric cable can also be coated by helically wrapping it with a tape made from the uncured composition, and then passing the coated cable through a pressurized steam tube or other suitable heat zone to cure the coating.

The present composition is beneficially useful for the formation of a durable and heat-resistant vulcanized semiconductive layer or jacket on an electric cable, particularly when the electric cable is one which has been coated with a polymeric insulation layer which can be cured with a peroxide curing agent. In a preferred manner of using the present composition, the principal polymer component of the polymeric insulation layer is a peroxide-curable polymer such as polyethylene or a copolymer of at least 40 percent by weight of ethylene and at least one monomer copolymerizable therewith (e.g., the copolymer of component (B) described above); and at least the outer-most portion of the insulation layer is cured by means of being heated while in adherent contact with the semiconductor jacket and while said jacket is being cured. In this manner a composition of this invention can be used with unexpected effectiveness in the manufacture of an electric cable in which the vulcanized jacket is bonded to the insulation layer, the strength and the nature of the bond being such that (1) the bond is not damaged during normal handling and use of the cable, and (2) any portion of the jacket can be stripped from the insulation layer by conventional stripping techniques during cable-installation operations. The following examples illustrate the invention; all amounts are by weight unless otherwise indicated.

EXAMPLE 1

An elastomeric composition having the utility described in the previous paragraph is prepared by (1) mixing the following ingredients in a Banbury mixer: 100 parts of chlorosulfonated polyethylene (chlorine content of 35 percent and sulfur content of 1 percent), 43 parts of an EPDM rubber which is a copolymer of 52 percent ethylene, 44 percent propylene and 4 percent 1,4-hexadiene (Mooney viscosity of 40), 71.5 parts of conductive carbon black (high structure furnace black), 50 parts of a mixture composed of 90 percent litharge and 10 percent of said EPDM rubber, 21.5 parts of chlorinated paraffin wax (chlorine content of 40 percent), 2.9 parts of petroleum wax having a melting range of 73°–77°C, and 0.7 part of polymerized trimethyldihydroquinoline ("Agerite" resin D from R. T. Vanderbilt Company), (2) allowing the temperature of the resulting mixture to rise to 110°C during a mixing period of about 6 minutes, (3) banding the mixture on a two-roll mill at 37°C and adding 3.6 parts of dicumyl peroxide and 7.1 parts of trimethylolpropane trimethacrylate, and (4) removing the resulting composition from the mill as a sheet whose thickness is 0.075 inch.

A 6-inch square portion of the sheet is placed in superposed contact with a 6-inch square piece of a 0.075-inch thick curable insulation sheet material made from a composition containing low density polyethylene resin plus a small amount of the following: polymerized trimethyldihydroquinoline and dicumyl peroxide. The resulting assembly is cured in the press for 45 minutes at 154°C under a platen pressure of 20,000 pounds. A 1-inch wide strip of the resulting cured composite sheet material is tested to determine the strength of the bond between the two layers. The test method is a 180° peel test, pulling at 2 inches per minute, according to ASTM method D–413. The bond strength is found to be 27 pounds per linear inch.

A much lower bond strength is obtained when Example 1 is repeated except an elastomeric composition outside the present invention is used wherein the 43 parts of EPDM rubber added in step (1) is replaced with an additional 43 parts of the chlorosulfonated polyethylene.

A much lower bond strength is also obtained when Example 1 is repeated except an elastomeric composition outside the invention is used wherein the ingredients added in step (3) are replaced with 2.9 parts of tetramethylthiuram disulfide and 1.43 parts of sulfur.

EXAMPLE 2

Another useful elastomeric composition of the present invention is prepared by (a) mixing the following ingredients in a Banbury mixer: 100 parts of chlorinated linear polyethylene (chlorine content of 43 percent), 20 parts of a low density polyethylene whose melt index is 6, 45 parts of conductive furnace black, 4 parts of dibasic lead phthalate, and 2 parts of petroleum wax having a melting range of 73°–77°C, and (b) after the mixture has reached a temperature of 110°C, banding it on a two-roll mill at 37°C and adding 2.5 parts of dicumyl peroxide and 2 parts of trimethylolpropane trimethacrylate.

When a sheet of the resulting composition is cured in contact with a sheet of polyethylene insulation material in the manner described in Example 1, a much stronger bond is obtained than when the Example 2 composition is replaced with an elastomeric composition outside the invention wherein the 20 parts of polyethylene in the Example 2 composition are replaced with an additional 20 parts of the chlorinated polyethylene.

I claim:

1. An elastomeric composition, useful for the manufacture of a vulcanized semiconductive layer on an electric cable, which comprises
   A. 100 parts by weight of an elastomer selected from the group: chlorosulfonated polyethylene and chlorinated polyethylene,
   B. about 15–100 parts by weight of a polymer selected from the group: polyethylene having a melt index of about 0.5–100 and copolymers of at least 40 percent by weight of ethylene and at least one monomer selected from propylene and dienes,
   C. about 40–150 parts by weight of electrically conductive carbon black, and
   D. about 1–10 parts by weight of a peroxide curing agent.

2. A composition according to claim 1 which also contains about 0.5–15 parts by weight of an auxiliary curing agent which is a non-peroxide compound of enhancing the state of cure obtained with component (D).

3. A composition according to claim 2 wherein component (A) is chlorosulfonated polyethylene, and component (B) is a copolymer of about 50–75 percent by weight of ethylene, about 20–45 percent by weight of propylene and about 3–16 percent by weight of 1,4-hexadiene or 5-ethylidene-2-norbornene.

4. A composition according to claim 3 which also contains about 10–50 parts by weight of a plasticizer for component (A), and about 2–70 parts by weight of an acid acceptor type of heat stabilizer for component (A).

5. A composition according to claim 4 which contains about 20–50 parts by weight of component (B), about 45–75 parts of component (C), about 2–5 parts of component (D), about 2.5–10 parts of the auxiliary curing agent, and about 4–55 parts of the acid acceptor.

6. A composition according to claim 4 wherein component (D) is dicumyl peroxide.

7. A composition according to claim 4 wherein the acid acceptor is litharge.

8. A composition according to claim 4 wherein the auxiliary curing agent is trimethylolpropane trimethacrylate.

9. A composition according to claim 4 wherein said plasticizer is selected from the group: hydrocarbon oils and chlorinated paraffin.

10. A cured elastomeric composition obtained by heating the composition of claim 1.

* * * * *